US006876452B2

(12) United States Patent
Evans et al.

(10) Patent No.: US 6,876,452 B2
(45) Date of Patent: Apr. 5, 2005

(54) APPARATUS AND METHODS FOR HIGH ACCURACY METROLOGY AND POSITIONING OF A BODY

(75) Inventors: Christopher James Evans, Higganum, CT (US); Carl A. Zanoni, Middlefield, CT (US)

(73) Assignee: Zygo Corporation, Middlefield, CT (US)

( * ) Notice: Subject to any disclaimer, the term of this patent is extended or adjusted under 35 U.S.C. 154(b) by 325 days.

(21) Appl. No.: 10/304,661

(22) Filed: Nov. 26, 2002

(65) Prior Publication Data

US 2003/0112445 A1 Jun. 19, 2003

Related U.S. Application Data (60) Provisional application No. 60/341,602, filed on Dec. 13, 2001.

(51) Int. Cl.[7] .................................................. G01B 9/02
(52) U.S. Cl. ...................................................... 356/498
(58) Field of Search ............................... 356/498, 486, 356/493, 452

(56) References Cited

U.S. PATENT DOCUMENTS 5,486,922 A * 1/1996 Cordova ...................... 356/465
5,896,197 A * 4/1999 Coffin ......................... 356/452

OTHER PUBLICATIONS

Holmes, M., et al., "The Long–Range Scanning Stage: a Novel Platform for Scanned–Probe Microscopy," Precision Engineering, vol. 24, No. 3, pp. 191–209, Jul. 2000.
Ruijl, T., "Ultra Precision Coordinate Measuring Machine: Design, Calibration, and Error Compensation," p137, Doctoral Thesis, Feb. 2001, Delft Technical University.

Evans, C., et al., "Self–Calibration: reversal, redundancy, error separation, and absolute testing", CIRP Annals, vol. 45/2, 1996.

Weingaertner, I., et al., "Novel scanning technique for ultraprecise measurement of topography," Proc. SPIE vol. 3782, pp306–317, Nov. 1999.

Whitehouse, D. "Handbook of Surface Metrology", pp115–119, Institute of Physics Publishing, 1994.

Deck, L. "Multiple Surface Phase Shifting Interferometry," presented at SPIE meeting in San Diego, Aug. 1, 2001.

Zanoni, C., Differential Interferometer Arrngements for Distance and Angle Measurements: Principles, Advantages, and Applications, VDI Berichte, NR 749, pp 93–106, 1989.

* cited by examiner

Primary Examiner—Gregory J. Toatley, Jr.
Assistant Examiner—Patrick Connolly
(74) Attorney, Agent, or Firm—Francis J. Caufield (57) ABSTRACT

Apparatus and methodology by which the position, angular orientation, and departure of a moving body, such as a scanning head, can be measured with high accuracy with respect to a nominally straight line as the body translates along that line. Monolithic metrology and scanning heads with integrally formed metrology surfaces are provided and fabricated of preferably identical materials having low thermal coefficients and high temporal stability. Measuring systems operate in conjunction with the integral metrology surfaces to provide interferometric information by which the position and angular attitude of the moving body is constantly monitored. Calibration arrangements are provided for determining the absolute position and attitude of the moving body with respect to the metrology frame as the two move relative to one another so that any errors can be compensated with appropriate correction functions.

15 Claims, 9 Drawing Sheets

APPARATUS AND METHODS FOR HIGH ACCURACY METROLOGY AND POSITIONING OF A BODY

CROSS REFERENCE TO RELATED APPLICATION

This application claims priority from U.S. Provisional Patent Application No. 60/341,602 filed on Dec. 13, 2001 in the name of Christopher James Evans, et al. for "APPARATUS AND METHOD FOR HIGH ACCURACY METROLOGY AND POSITIONING OF A BODY", the entire contents of which are incorporated herein by reference.

BACKGROUND OF THE INVENTION

This invention generally relates to interferometry and more particularly to apparatus and methods for interferometrically measuring with high accuracy the position and angular orientation of a body as it travels along a nominally straight line in, for example, a process for determining the shape of optical surfaces such as aspherical surfaces and wavefronts.

Aspherical surfaces have become more and more important in modern optical systems because they offer a higher number of parameters for simplifying systems while optimizing their performance. This can lead to systems with less surfaces, less weight, smaller dimensions and higher states of correction, to mention only a few advantages. This is especially true in fields where a high number of optical surfaces are not practical, like in astronomical telescopes or normal incidence reflecting surfaces for the EUV wavelength of 13.6 nm used for lithography tools, where it is mandatory to keep the number of surfaces as low as possible. In such cases, there is no choice but to use aspherical surfaces. With demands for high quality performance for complete systems operating in the EUV-regime, the surface errors of reflecting surfaces within such a system must be kept below 0.1 nm rms, and the measuring accuracy and precision for such errors must be even higher to be able to produce the surfaces in a deterministic manner. In addition, lens surfaces in multi-element lithography lenses operating at wavelengths of 193 nm and 157 nm are made aspherical to lower the number of elements made, which are of rare and expensive materials. In these cases, the departures from a best fitting sphere can be as large as 1000 $\mu$m or more, and the dimensions of such lens surfaces have increased to nearly 500 mm.

In an optical system, the function of any its lens elements is to modify the wavefront transmitted by the individual lens elements according to the optical design of the whole system. If a spherical wave or a plane wave enter such a lens, an aspherical wavefront with a very high departure from the best fitting sphere is produced, depending on the conjugates used in the particular test-configuration. So even the fundamental single lens element with either spherical or aspherical surfaces can only be tested properly if one is able to deal with aspherical wavefronts in a test set-up. Moreover, this ability is very important for testing wavefronts transmitted through lens elements because inhomogeneity of the lens material itself can deteriorate the wavefront, even when the surfaces are otherwise free of error.

The measurement of aspherical surfaces and wavefronts has been very difficult because of the large departure from the best fitting sphere. With interferometric measurements, high precision is achieved by making the dynamic range of the measurement very small, and for this purpose, the wavefront of the reference wavefront, against which the aspherical wavefront is compared, has to be made aspherically as well to ideally fit the wavefront to be measured completely.

Recently, interferometric scanning method(s) and apparatus have been developed for measuring rotationally and non-rotationally symmetric test optics either having aspherical surfaces or that produce aspherical wavefronts. In such scanning method(s) and apparatus, a spherical or partial spherical wavefront is generated from a known origin along an optical or scan axis. The test optic is aligned with respect to the scanning axis and selectively moved along it along a nominally straight line relative to the known origin so that the spherical wavefront intersects the test optic at the apex of the aspherical surface and at radial positions where the spherical wavefront and the aspheric surface intersect at points of common tangency. An axial distance, v, and optical path length, p, are interferometrically measured as the test optic is axially scanned by the spherical wavefront where v is the distance by which the test optic is moved with respect to the origin and p is the optical path length difference between the apex of an aspherical surface associated with the test optic and the apex of the circles of curvature that intersect the aspherical surface at the common points of tangency. Coordinates of the aspherical surface are calculated wherever the circles of curvature have intersected the aspherical surface and in correspondence with the interferometrically measured distances, v and p. Afterwards, the shape of the aspheric surface is calculated. Where the test optic comprises a refracting optic a known spherical reflecting surface is provided upstream of the refracting optic for movement along the optical axis and a known wavefront is made to transit the refracting optic, reflects from the known spherical surface, again transits the refracting optic traveling towards the known origin after which the interferogram is formed (See, e.g., U.S. Provisional Patent Application No. 60/303,856 filed on Jul. 9, 2001 in the name of Michael K üchel entitled "SCANNING INTERFEROMETER FOR ASPHERIC SURFACES AND WAVEFRONTS", now U.S. patent application Ser. No. 10/180,285 filed on Jun. 26, 2002).

With such scanning methodologies, as well as for other distance and angle measuring applications, it is extremely important to be able to know to high accuracy what the relative position is between the test optic and the source of the scanning wavefront as the two are moved relative to one another. To determine the shape of optical surfaces to submicron accuracy, it is desirable to be able to measure the position of the various elements of such scanning applications with respect to the scan axis to subnanometer accuracy, and it is a primary object of the present invention to provide method(s) and apparatus by which this can be achieved.

It is another object of this invention to provide method(s) and apparatus for interferometrically measuring relative or absolute distances with high accuracy.

It is another object of the invention to provide method(s) and apparatus for interferometrically measuring slopes, curvatures, and shapes of optics with high accuracy.

It is still another object of the present invention to provide interferometric method(s) and apparatus for high accuracy measurement using redundant, self-checking metrology of the straightness of motion of a moving element along its travel.

Another object of this invention is to provide comparative, self-checking methods for calibrating the straightness of a scanning path in an interferometer.

Other objects of the invention will, in part, be obvious and will, in part, appear hereinafter when the following description is read in connection with the drawings.

SUMMARY OF THE INVENTION

A method and apparatus is disclosed for the high accuracy, multiple degree of freedom metrology and positioning of a body including means for calibration and error compensation. The invention comprises a first element made preferably from a low temperature coefficient, temporally stable material including integral surfaces each of which is used as one surface of a measuring system, preferably collectively serving as a metrology frame. A second element is provided and is made preferably from a low temperature coefficient, temporally stable material including integral surfaces which are used in conjunction with the surfaces on the first element by at least one measuring system. At least one slide and at least one actuator act to move the second element relative to the first element, preferably by a large distance in at least one dimension. Multiple measuring systems operate to measure either at least the gap, an angle, or two angles between a surface in the first element and the second element. Curvature of a surface on or in the first element can be measured. The first and second elements are preferably made of the same material in a monolithic type structure with no dissimilar materials. A metrology system comprised of the measuring systems preferably take redundant measurements of multiple degrees of freedom of the second element relative to the first element, and embodiments are shown where this may be done for all six degrees of freedom of the moving element.

BRIEF DESCRIPTION OF THE DRAWINGS

The structure, operation, and methodology of the invention, together with other objects and advantages thereof, may best be understood by reading the detailed description in connection with the drawings in which each part has an assigned a descriptive label or numeral that identifies it wherever it appears in the various drawings and wherein.

DETAILED DESCRIPTION OF THE INVENTION

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The present invention relates to interferometric systems that are capable of moving with high accuracy one body relative to another along a straight line to enable, for example, measurement of optical surfaces and wavefronts particularly, but not limited to, those with aspheric shapes.

Figure 1:
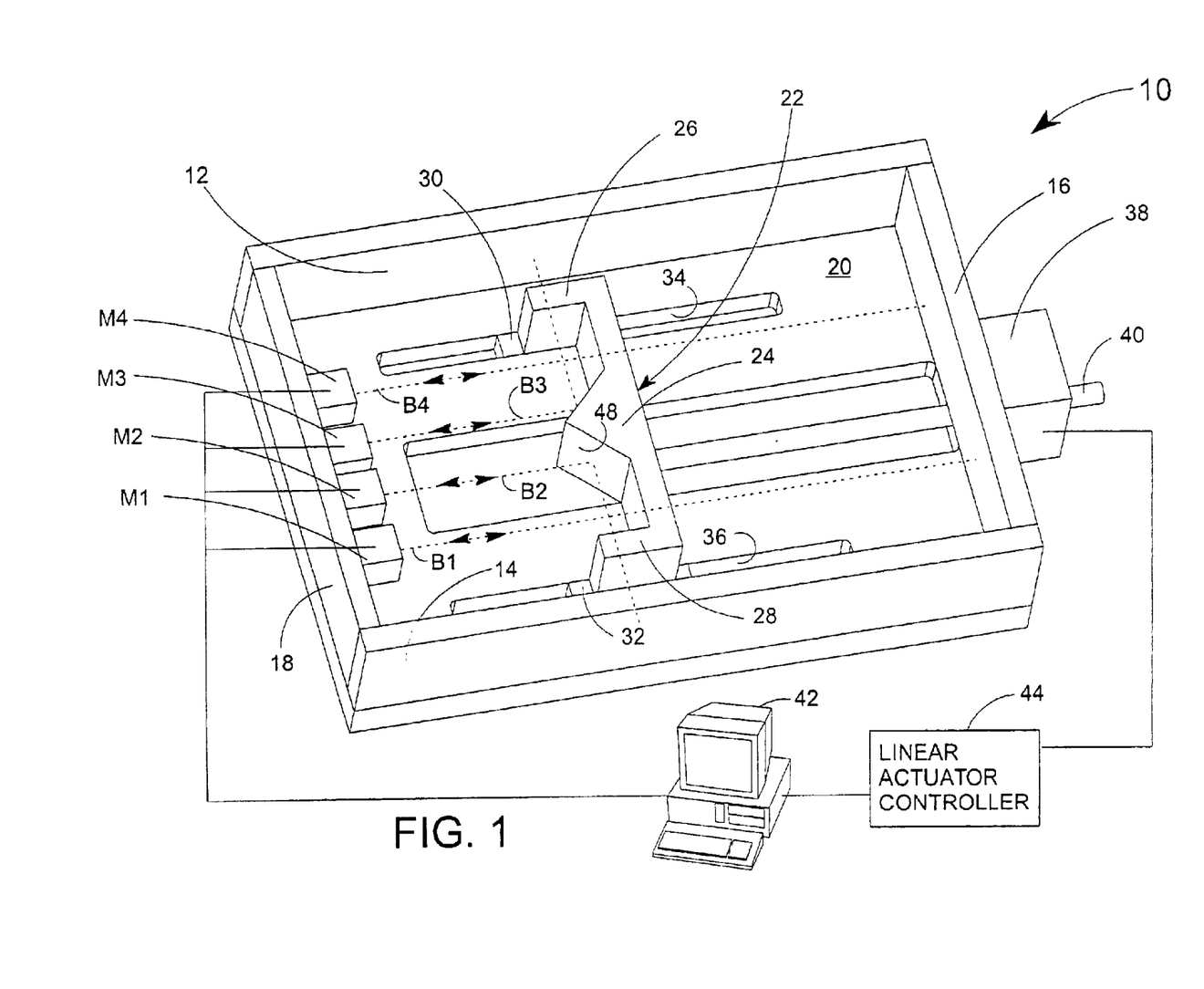
FIG. 1 is a diagrammatic perspective view of a scanning interferometer system in accordance with the invention.

Reference is now made to FIG. 1 which shows a scanning interferometric system 10 that uses a minimum number of parts to move two major components relative to one another along a straight line while measuring their relative position and attitude to high accuracy. As seen in FIG. 1, system 10 comprises a preferably fixed metrology frame having a pair of opposed sides 12 and 14, opposed top wall 16 and bottom wall 18, and a base 20. The various components of the metrology frame are preferably formed as a monolithic structure of a material that possesses a low thermal coefficient and is otherwise temporally stable. The interior surfaces of the sides of the metrology frame are integrally formed as reflecting surfaces to be used as part of a metrology system to be described.

System 10 also includes a generally "w"-shaped scanning member or head 22 that is mounted for linear motion with respect to base 20; base 20 being provided with opposed parallel linear slides, 34 and 36, which carry precision bearings (e.g., gas or magnetic levitation), 30 and 32, respectively, attached to the bottoms of the opposed ends, 26 and 28, of "w"-shaped scanning head 22. Scanning head 22 is driven in its slideways via a linear motor 38 having an attached drive shaft 40, or other similar well-known drive mechanisms.

Scanning head 22 is also preferably formed as a monolithic structure of a material having a low thermal coefficient and possessing temporal stability. The metrology frame of the invention and scanning head 22 are preferably formed of the same material selected from the group preferably consisting of Invar®, super Invar, ZeroDur® (manufactured and sold by Schott Optical, Duryea, Pa.), fused silica, silicon carbide, and silicon carbide composites.

Scanning head 22 is preferably formed with integrally formed optically polished surfaces to serve as part of system 10's metrology system. Included among these surfaces are integral reflecting surfaces 46 and 48 (See FIG. 2A as well).

The members comprising the monolithic metrology frame and the scanning head 22 can be made a number of ways as by:
1. machining from a solid block of material and then polishing the surfaces;
2. assembling separate parts by (not adhesives for thermal and temporal stability) using optical contacting, or bonding using the KOH process.

Method 1 serves for external surfaces, and method 2 is preferred for internal surfaces.

Measuring systems M1 through M4 are mounted to the top wall 16 of system 10's metrology frame and generate measurement beams B1 through B4, respectively, for monitoring the position and orientation of scanning head 22 with respect to the fixed metrology frame. It will be understood that each of the beams B1 through B4 may actually contain multiple beams to perform interferometric metrology functions to be described hereinafter. Briefly, however, measuring systems M1 through M4 may be employed as part of heterodyne or homodyne interferometric systems, spatial fringe encoding systems, or wavelength locking systems. Capacitance gauges may be included for measuring small gaps when used in conjunction with properly metallized surfaces and inductive sensors may also be beneficially used to generate positional information.

Movement of scanning head 22 with respect to system 10's fixed metrology frame is controlled via a linear actuator controller 44 connected to linear motor 38, and all under the management of a computer 42 programmed in a well-known manner for this purpose. Computer 42 also serves to manage measuring systems M1 through M4 by providing control signals, receiving metrology signals, and performing analytical functions. In addition, computer 42 provides general housekeeping functions and acts as a user interface for taking commands and displaying information in screen or hardcopy form. Information may also be stored on internal or external memory, which may also serve for storing information such as look-up tables (LUTs) bearing calibration, or similar information as will be subsequently explained.

Figure 2A:
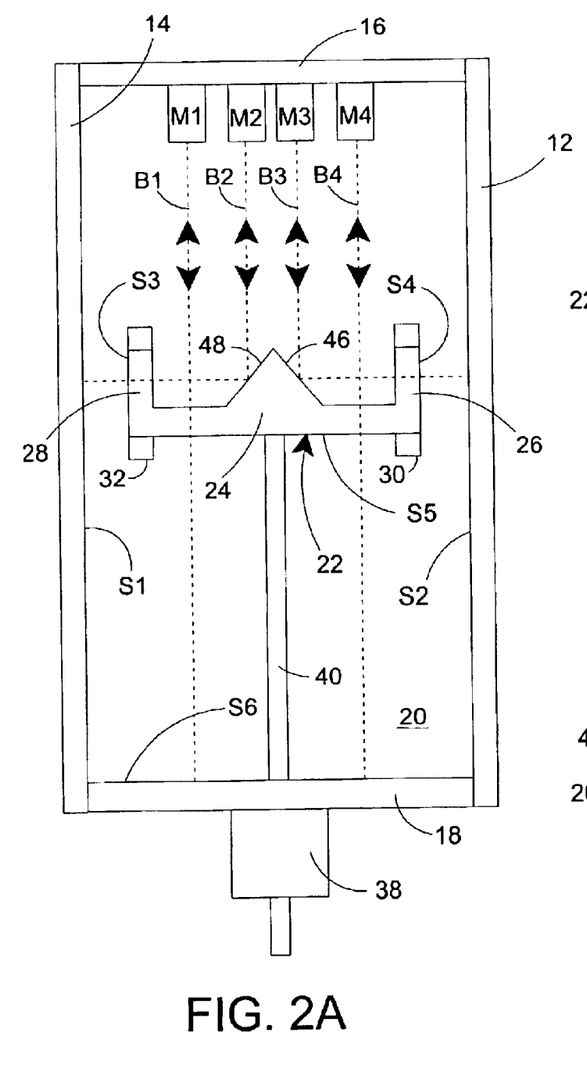
FIG. 2A is a diagrammatic elevational view of the scanning interferometer system of FIG. 1 shown vertically oriented in its normal mode of operation.
Figure 2B:
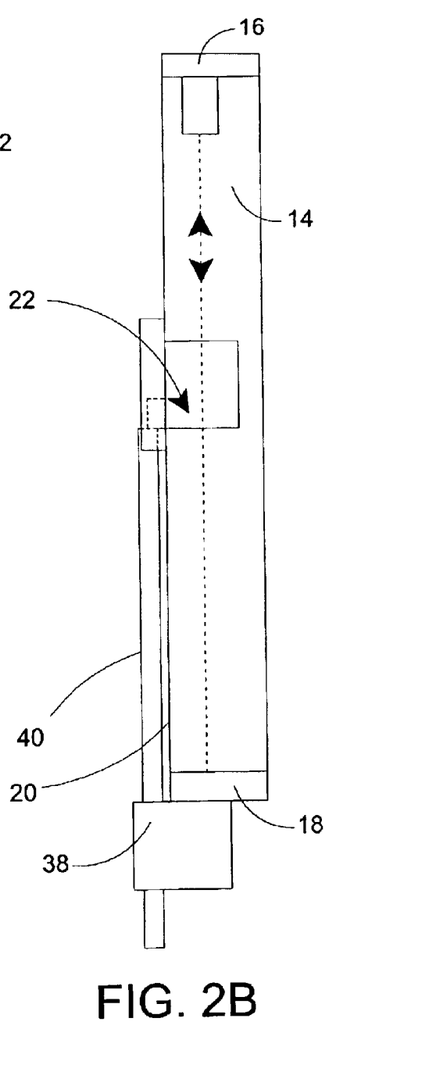
FIG. 2B is a side elevational view of the scanning interferometer of FIG. 2A.

As best seen in FIGS. 2A and 2B, system 10 may operate in any orientation but for clarity is described here as operating in a vertical orientation with the scanning head 22 moving up and down in a vertical or scan direction. Operated in this manner, the bottom surface of scanning head 22, designated here as S5, may be provided with a monolithic mounting structure to which a test or calibration optic may be rigidly mounted for movement therewith to and away from the inwardly facing surface, here S6, of bottom wall 18. Surface S6 likewise may have mounted therewith a monolithic structure for carrying a point source for generating predetermined wavefronts to be used in a metrology arrangement of the type described in aforementioned U.S. Provisional Patent Application No. 60/303,856, now pending U.S. patent application Ser. No. 10/180,286 filed on Jun. 26, 2002, the entire contents of which are incorporated herein by reference as an example of a scanning interferometric system for measuring aspheric surfaces and wavefronts.

As best seen in FIG. 2A, side member 14 has an inner metrology surface S1, side member 12 an inner metrology surface S2, end 28 of scanning head 22 has an inner metrology surface S3, and end 26 of scanning head 22 has an inner metrology surface S4. Surfaces S1 through S6 comprise metrology surfaces by which the absolute and/or relative distances and angular orientation of scanning head 22 may be measured with respect to the metrology frame of system 10.

From FIGS. 2A and 2B, it should be clear that:
M1 measures the change in either
1. the relative distance between S5 and S6 or
2. the absolute distance between S5 and S6 and/or
3. the 2 angles between the 2 normals of S5 and S6

M2 measures the change in either
1. the relative distance between S1 and S3 or
2. the absolute distance between S1 and S3 & and/or
3. the 2 angles between the 2 normals of S1 and S3

M3 measures the change in either
1. the relative distance between S2 and S4 or
2. the absolute distance between S2 and S4 and/or
3. the 2 angles between the 2 normals of S2 and S4

M4 measures the change in either
4. the relative distance between S5 and S6 or
5. the absolute distance between S5 and S6 and/or
6. the 2 angles between the 2 normals of S5 and S6

MS1 and MS4 together measure changes in either
1. the relative distance between S5 and S6 along the center line(using the average value); or
2. the absolute distance between S5 and S6 along the center line (using the average value) and/or
3. the 2 angles between the 2 normals of S5 and S6(taking the difference)

The roll angle about axis of symmetry or scan axis may also be measured as well as the angles between the surfaces in a plane perpendicular to the axis of symmetry.

Figure 3A:
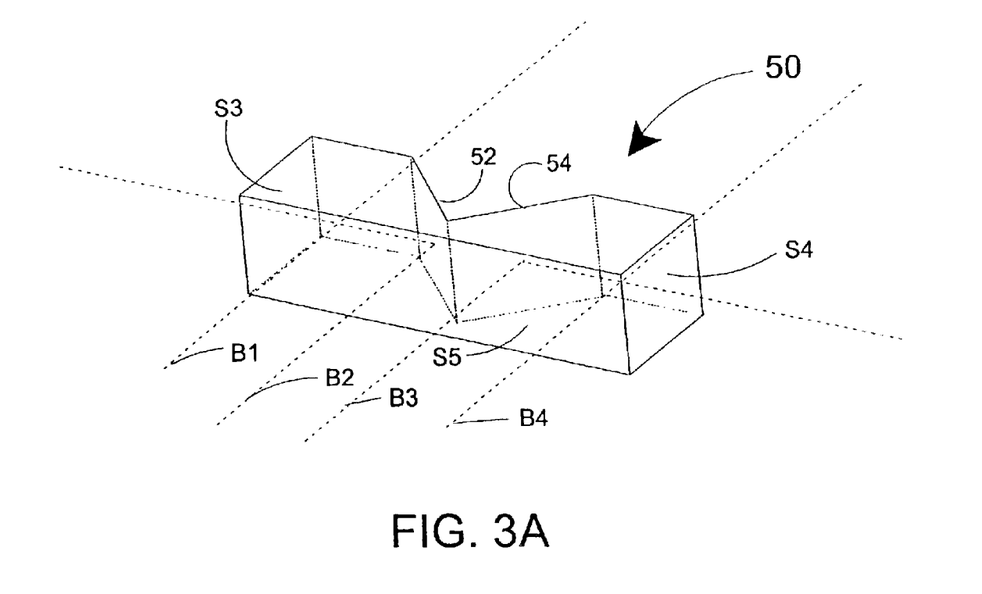
FIG. 3A is a diagrammatic perspective view of an alternate embodiment for the moving element of the scanning interferometer system of FIG. 1.
Figure 3B:
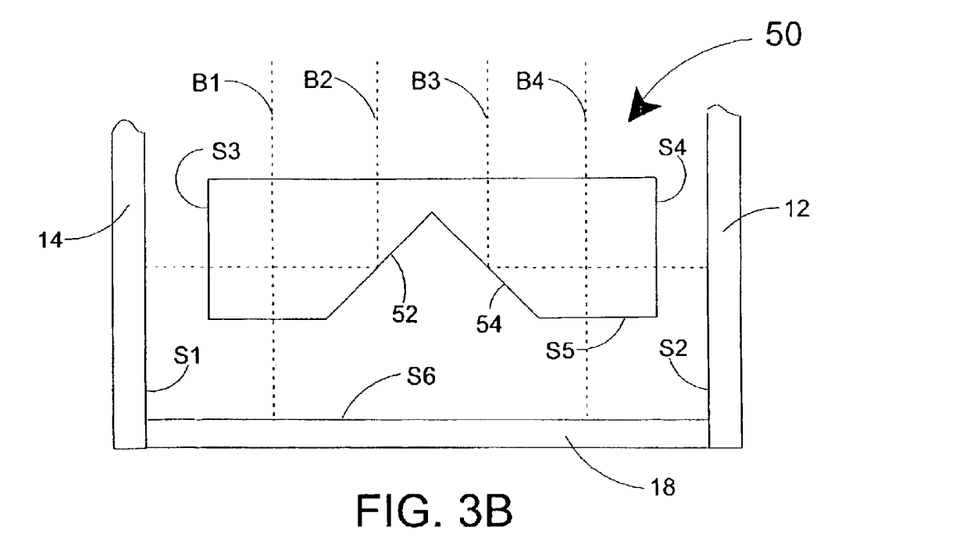
FIG. 3B is a diagrammatic plan view of the alternate embodiment of FIG. 3A.

FIGS. 3A and 3B show an alternate embodiment for the scanning head of the invention. Here, the scanning head is shown as a monolithic negative scanning head 50 that is provided with surfaces 52 and 54 that operate by total internal reflection to reflect incoming beams B2 and B3 through surfaces S3 and S4, respectively. Other functions remain as for the previous scanning head 22, except that the reflecting surfaces here provide a much higher degree of reflection.

Figure 4A:
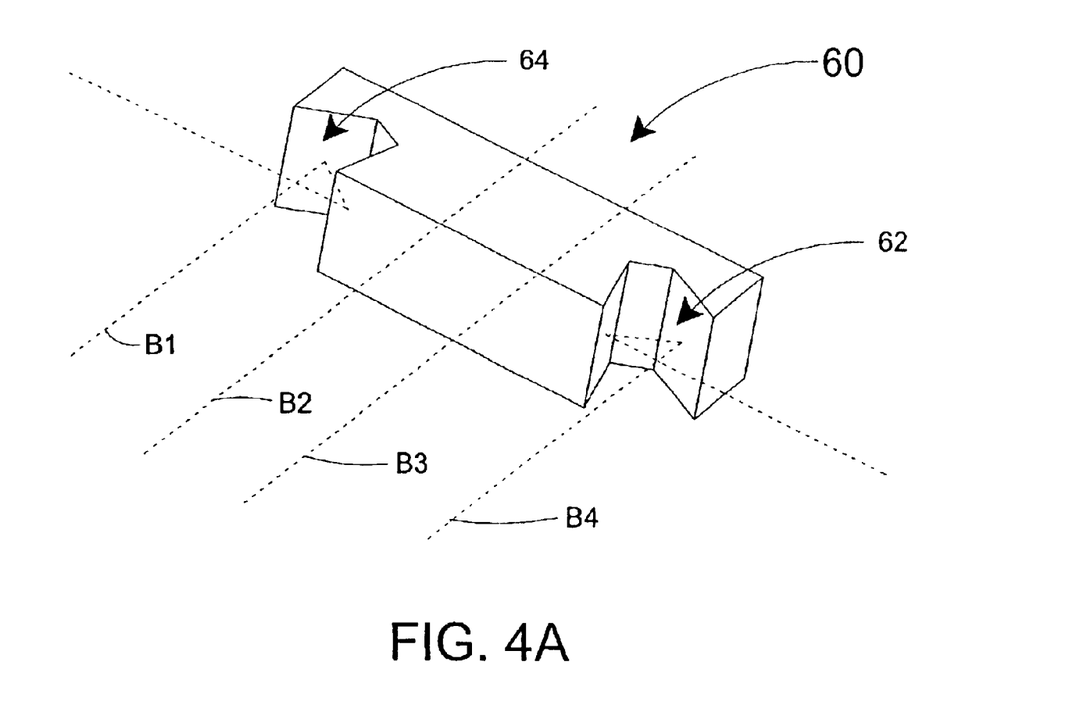
FIG. 4A is a diagrammatic perspective view of yet another alternate embodiment for the moving element of the scanning interferometer of FIG. 1.
Figure 4B:
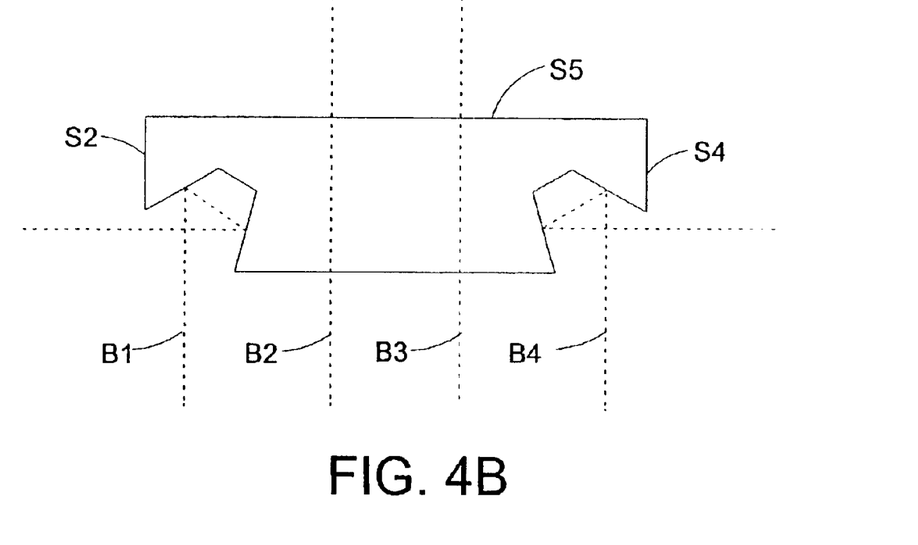
FIG. 4B is a diagrammatic plan view of the alternate embodiment of FIG. 4A.

FIGS. 4A and 4B show yet another possible embodiment for the scanning head of the invention. Here, a monolithic scanning head 60 is provided with open Penta prism end sections, 62 and 64, to direct incoming beams B1 and B4 to their corresponding side wall surfaces.

Figure 5A:
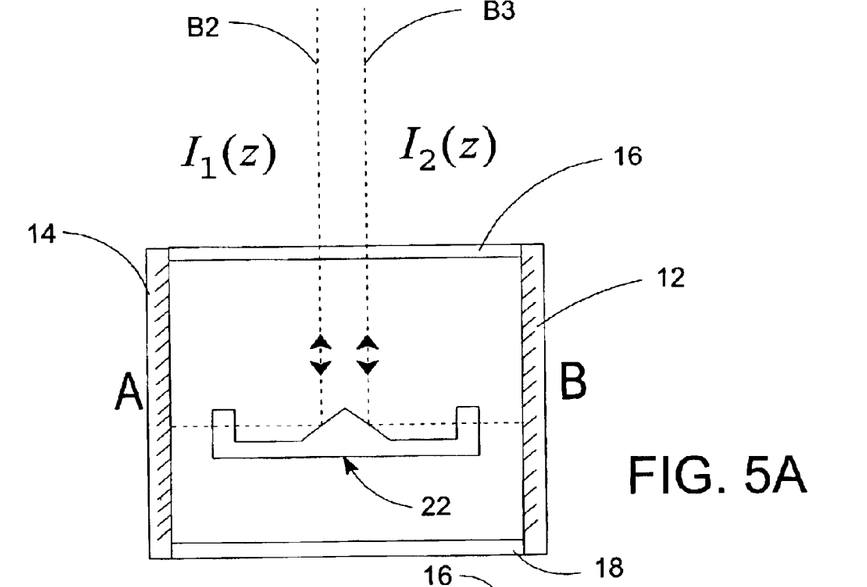
FIGS. 5A–5C are two-dimensional diagrammatic elevational views of arrangements for practicing intercomparison techniques for calibrating the scanning interferometers of the invention.
Figure 5B:
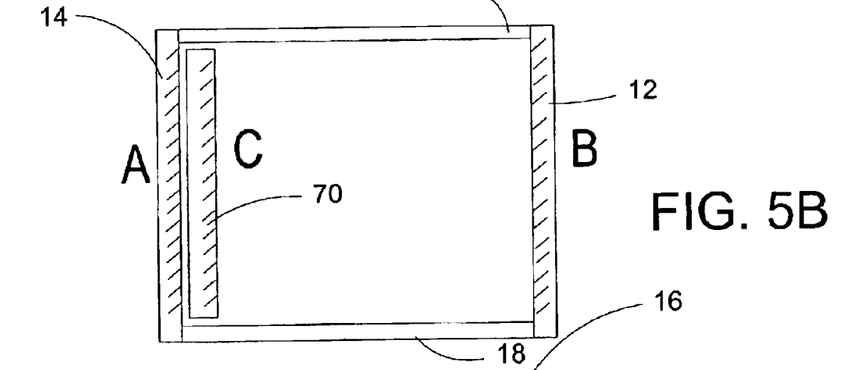
Figure 5C:
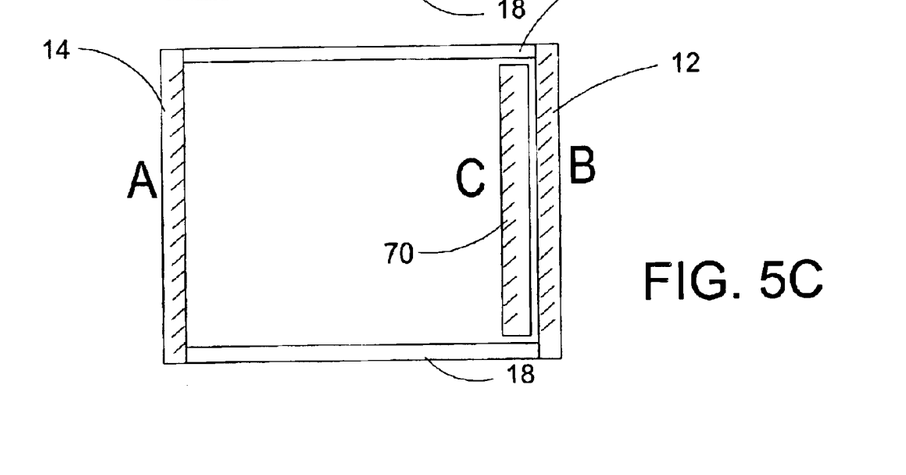

Reference is now made to FIGS. 5A through 5C which illustrate an intercomparison technique by which the absolute variation in the position and angular orientation of a scanning head, such as scanning head 22, can be measured taking into account the variation in individual surfaces and mounting and drive arrangements comprising the metrology system 10. In FIGS. 5A through 5C, beams B2 and B3 generate signals $I_1(z)$ and $I_2(z)$ to measure a straightness error $S(z)$ where z is the vertical coordinate and $S(z)$ is positive when the scanning head moves towards A and:

$$I_1(z)=S(z)+A(z) \quad (1)$$

$$I_2(z)=-S(z)+B(z) \quad (2)$$

For the setup in FIG. 5A it should be clear that:

$$M(t_1)=I_1(z)+I_2(z)=A(z)+B(z) \quad (3)$$

For the setup of FIG. 5B a transfer calibration member C is introduced such that:

$$M(t_2)=I_1(z)+I_2(z)=C(z)+B(z) \quad (4)$$

For the setup of FIG. 5C, transfer calibration member C is moved adjacent B such that:

$$M(t_3) = I_1(z) + I_2(z) = A(z) + C(z) \quad (5)$$

Combining results yields:

$$\frac{M(t_1) + M(t_2) - M(t_3)}{2} = B(z) \quad (6)$$

Hence, A(z) and C(z) may also be computed.

From the foregoing, the metrology system of the invention can be calibrated, and any errors in it can be compensated by applying a correction factor that varies with scan distance. The correction factors may be stored in a look-up table (LUT) stored on computer 42 and periodically updated as needed to account for temporal changes. To update the initial calibration, it is preferred to measure changes in straightedge slope by employing, for example, a sliding window digital Fourier transform analysis. Obviously, the foregoing intercomparison technique can be extended to include azimuths other than those shown.

Figure 6:
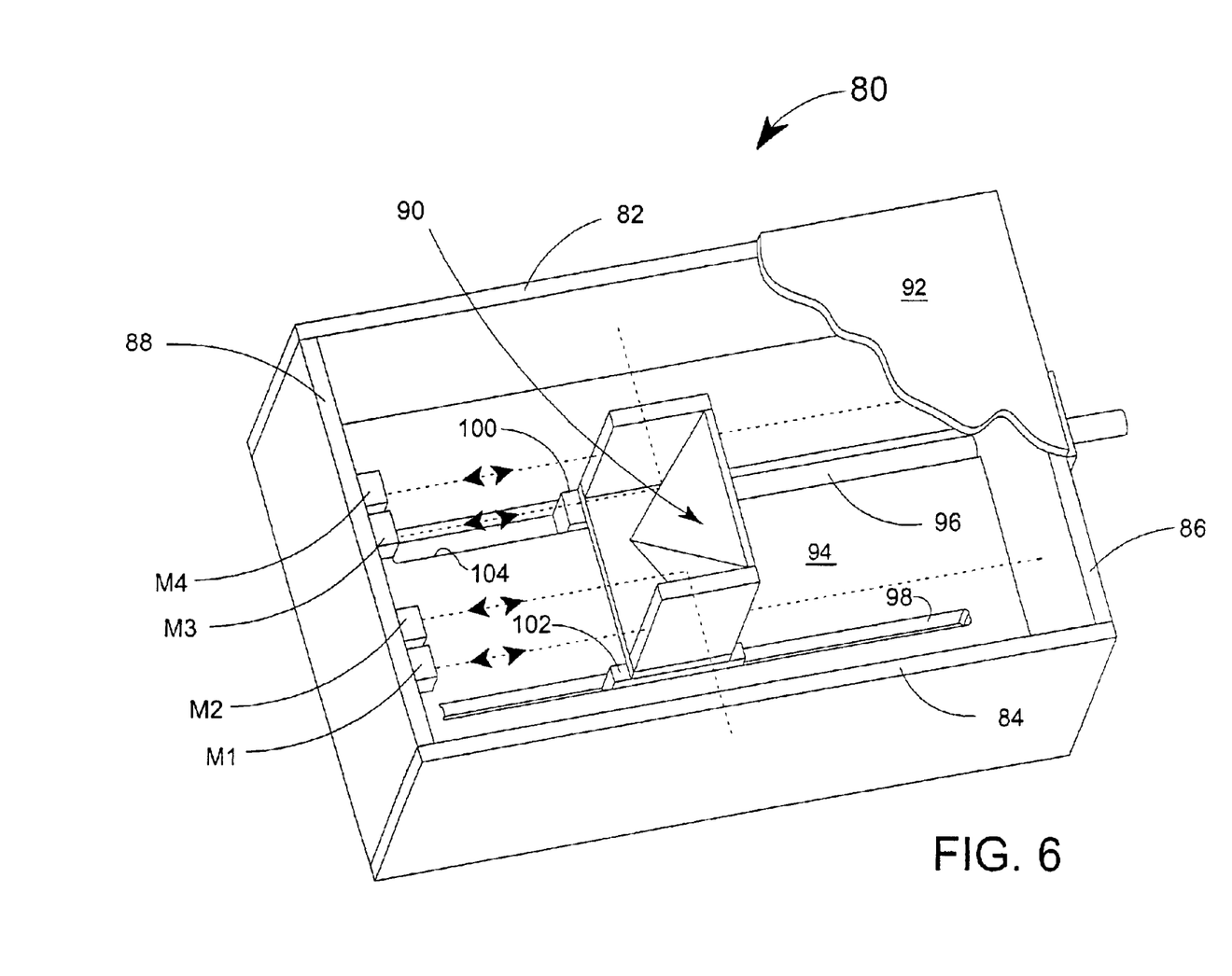
FIG. 6 is a diagrammatic perspective view of another embodiment of a scanning interferometer system in accordance with the invention where all six degrees of freedom of its moving element are redundantly measured.
Figure 7:
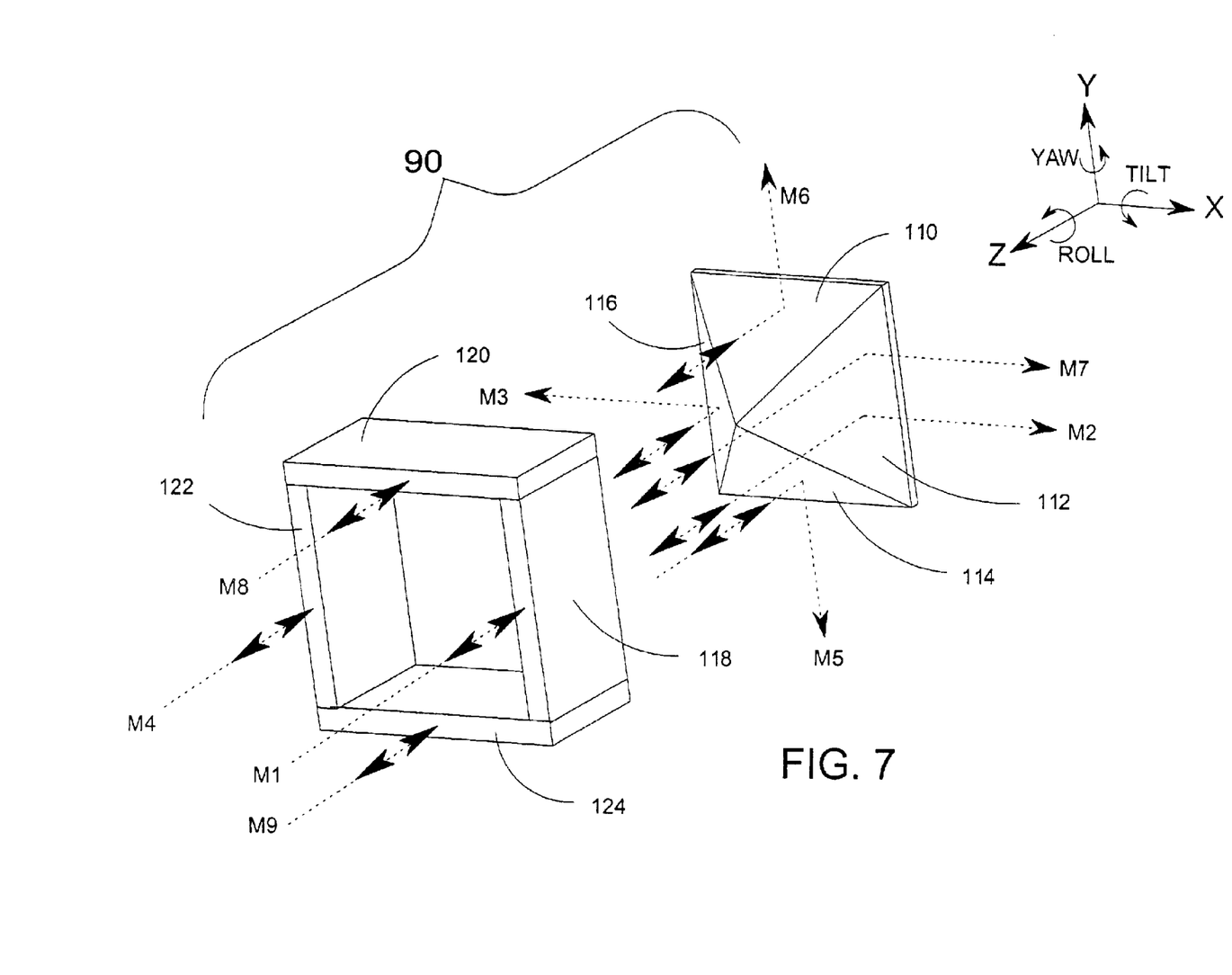
FIG. 7 is an exploded diagrammatic perspective view, with parts broken away, of part of the scanning interferometer of FIG. 6.

Reference is now made to FIGS. 6 and 7 which show a metrology system 80 having a different scanning head and metrology frame than that those shown previously in that they carry more surfaces for positioning the two with respect to one another and offer more redundancy to carry out that task.

Here, the metrology frame of system 80 comprises opposed bottom and top members 86 and 88, respectively, and opposed side members 82 and 84, respectively. An opposed base 94 and roof member 92 are also provided. A scanning head 90 rides on sideways 98 and 104 via precision bearings 102 and 100, respectively. Scanning head 90 is driven along the scan direction by shaft 96. Here again measuring systems M1 through M4, as well as others not shown in FIG. 7, are mounted to top member 88 to monitor the position and angular orientation of scanning head 90.

As best seen in FIG. 7, scanning head 90 comprises a monolithic structure formed of a box having sides 118, 120, 122, and 124 in which resides a four-sided pyramid having reflecting surfaces 110, 112, 114, and 116.

Here, M1, M4, M8, and M9 measure the average scan displacement with M1 and M4 measuring yaw about the Y-axis and M8 and M9 measuring tilt about the X-axis.

M5 and M6 measure the deviation from the nominal Y-position with respect to the scan direction and M2, M7, and M3, the deviation from the nominal X-position with M2 and M7 further measuring roll about the Z-axis. As will be seen, where the foregoing measurement systems comprise multiple beams, many of the measurements result in multiple redundant information. Calibration and material composition considerations remain the same for this embodiment as with the previous embodiments described.

Figures 8A, 8B:
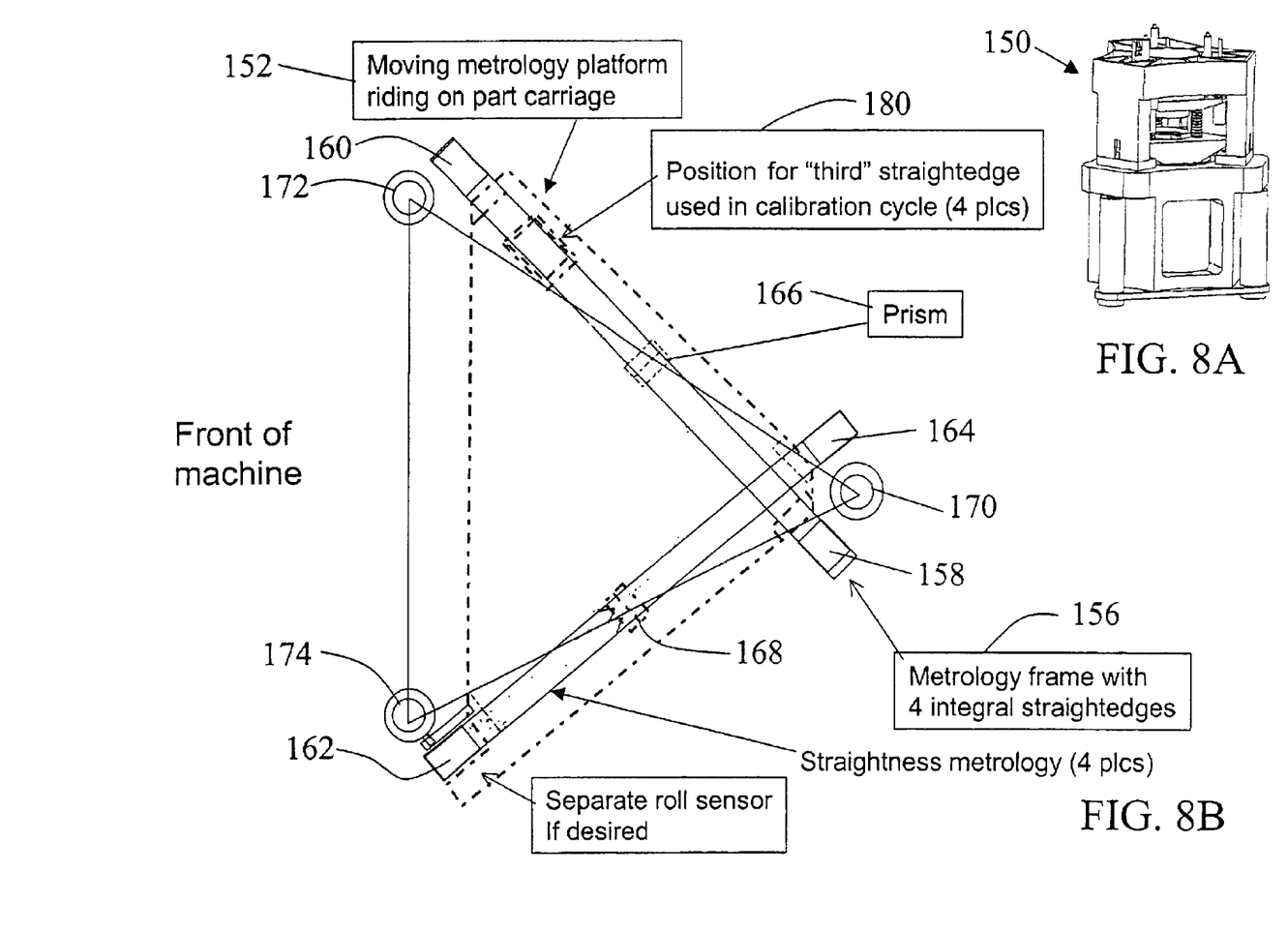
FIGS. 8A and 8B are perspective and diagrammatic planar views, respectively, of a triangular shaped scanning interferometer of the invention.

Reference is now made to FIGS. 8A and 8B which together illustrate another metrology architecture of the invention. Here, a generally triangular shaped system 150 is shown comprising a moving triangular shaped metrology platform 152 that moves vertically on a system of bearings 170, 172, and 174. As metrology platform 152 moves vertically, its position and angular orientation are measured with respect to a metrology frame 156 comprising four integral paired straight edges 158 and 160 and 162 and 164. Between straight edge pairs 158 and 160 is a prism 166 for directing beams to the bottom surface of metrology platform 152 and, likewise, between straightedge pairs 162 and 164 is another similarly functional prism 168. At 180, another position is provided for another transfer straightedge (a "third" straightedge) by which intercomparisons may be made to calibrate system 150 to provide an error correction function as before. It should be clear that architectures with an odd number of straightedges are possible. For example, triangular architectures are possible in which only three straightedges reside, one each corresponding to an apical point of a triangular shaped metrology platform. With such an arrangement, the transfer straightedge would alternately face each of the apically located straightedges to perform a three way intercomparison.

Figure 9A:
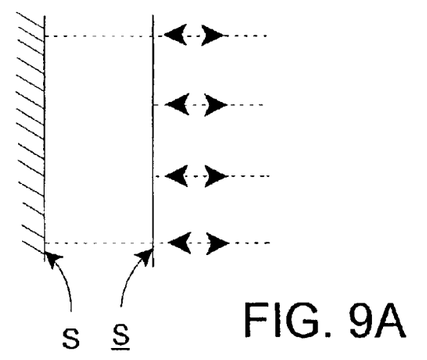
FIGS. 9A and 9B are diagrammatic side elevational and plan views, respectively, illustrating one interferometric technique for measuring displacement and angles in practicing the invention.
Figure 9B:
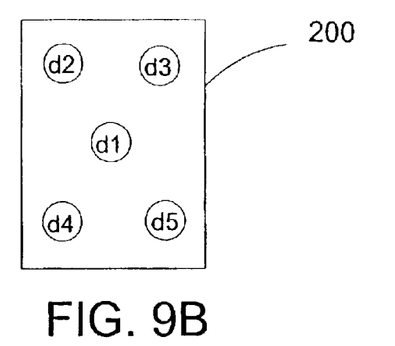

To accurately measure the distances and angles between any of the metrology surfaces of the illustrated embodiments, various preferred interferometric techniques may by employed. For example, FIGS. 9A and 9B illustrate a beam and detector array 200 arrangement for monitoring displacement and angular orientation of spaced nominally parallel surfaces S and S̲. Here, detector array 200 comprises five individual detectors d1 through d5 whose outputs can be averaged to provide displacement information and otherwise combined in pairwise fashion to measure angular orientation. Obviously, a minimum of three detectors could be used instead of five to obtain similar information. Homodyne and/or heterodyne signal processing may be used in conjunction with this detection arrangement. With heterodyning, a Zeeman source may be used with a split frequency of approximately 2 to 3 megahertz for high speed processing. For a higher split frequency, acousto-optic modulators (AOMs) and other well-known techniques can be used to modulate a source. Wavelength modulation techniques may also be beneficially used to carry out the interferometry.

Figure 10A:
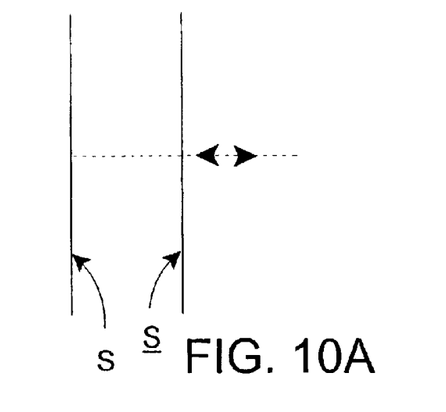
FIGS. 10A and 10B are diagrammatic side elevational and plan views, respectively, illustrating another interferometric technique for measuring displacement and angles in practicing the invention.
Figure 10B:
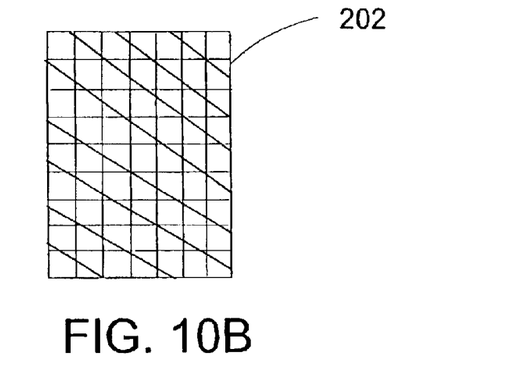

FIGS. 10A and 10B show a beam and detector arrangement employing spatial fringe encoding to measure principally angular orientation, but could be used to measure displacement as well. Here, surfaces S and S̲ have a slight, but deliberate tilt, introduced between them to generate a fringe pattern distributed over an areal detector array 202 as shown diagrammatically in FIG. 10B. If the angle between S and S̲ changes, the number of fringes seen by detector 202 changes. Displacement may be obtained by integrating the angular variation in the surfaces as a function of their linear displacement since this arrangement is essentially a slope detection scheme. Alternatively, the number of fringe passings from a "zero" point may be counted to obtain displacement, but this is less preferred.

Figure 11:
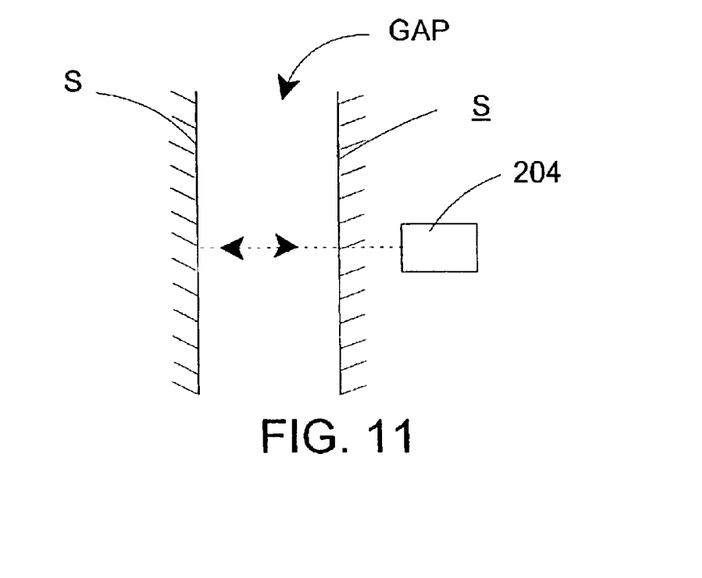
FIG. 11 is a diagrammatic elevational view for practicing yet another interferometric methodology of the invention.

FIG. 11 illustrates a wavelength locking arrangement for measuring the gap between surfaces S and S̲ arranged here in the form of a high finesse cavity such as a Fabry Perot. As the Fabry Perot is translated, variations in its gap are interferometrically measured by monitor 204. Since the resonance characteristics of the cavity change to provide a signal that varies with gap and operating wavelength, the signal may be restored to a reference value by varying the wavelength, and the change in wavelength necessary to restore the reference value is correlated with gap change.

The types of Interferometers that may be used to practice the invention include: Fizeaus employing phase shifting (PSI) and/or Spatial Fringe Encoding; and/or Displacement Measuring Interferometers such as a differential plane mirror interferometers (DPMI). For angle measurement a scanning autocollimator or spatial fringe interferometer may be used.

In view of the foregoing, it should be clear that a method and apparatus has been provided for high accuracy, multiple degree of freedom metrology and positioning of a body including means for calibration and error compensation. Multiple measuring systems operate to measure either at least the gap, an angle, or two angles between a surface in a first element and a second element. Curvature of a surface in or on the first element can also be measured. The first and second elements are preferably made of the same material in a monolithic type structure with no dissimilar materials. A metrology system comprised of the measuring systems preferably take redundant measurements of multiple degrees of freedom of the second element relative to the first element, and embodiments have been shown where this may be done for all six degrees of freedom of the moving element.

Based on the above description and teachings of the invention, other embodiments will be apparent to those skilled in the art, and these are intended to be within the scope of the invention as defined by the appended claims, along with the full range of equivalents to which the claims are entitled.

What is claimed is:

1. Apparatus for the high accuracy, multiple degree of freedom metrology and positioning of a body, said apparatus comprising:
   a first element made preferably from a low temperature coefficient, temporally stable material including integral metrology surfaces each of which is used as one surface of a measuring system and are configured and arranged to serve as a metrology frame;
   a second element made from a low temperature coefficient, temporally stable material including integral metrology surfaces which are used in conjunction with the integral metrology surfaces on said first element;
   at least one slide and at least one actuator for moving said second element relative to the first element by a large distance in at least one dimension; and
   multiple measuring systems configured and arranged to operate in conjunction with said integral metrology surfaces of said first and second elements to provide information by which the position and angular attitude of said second element with respect to said first element can be determined.

2. The apparatus of claim 1 wherein said first and second elements are preferably made of the same material in a monolithic type structure.

3. The apparatus of claim 1 wherein said measuring systems are configured and arranged to take redundant measurements of multiple degrees of freedom of said second element relative to said first element.

4. The apparatus of claim 1 wherein said integral metrology surfaces of said first and second elements comprise at least one pair of oppositely facing surfaces that are parallel to one another and perpendicular to the direction of relative motion between said first and second elements in said at least one dimension.

5. The apparatus of claim 1 wherein said integral metrology surfaces of said first and second elements comprise at least one pair of corresponding surfaces that are at an angle with respect to one another and one of which is parallel to the direction of relative motion between said first and second elements in said at least one dimension.

6. The apparatus of claim 1 wherein said second element is multifaceted having at least one metrology surface that is at an angle with respect to the direction of relative motion between said first and second elements in said at least one dimension.

7. The apparatus of claim 6 wherein said metrology surface that is at an angle operates by total internal reflection.

8. The apparatus of claim 1 wherein the material of which said first and second elements is made is selected from the group comprising Invar®, super Invar, ZeroDur®, fused silica, silicon carbide, and silicon carbide composites.

9. The apparatus of claim 1 wherein said multiple measuring systems comprise at least one interferometer.

10. The apparatus of claim 1 further including means for determining the absolute variation in the position and angular orientation of said second element with respect to said first element taking into account the variation in individual metrology surfaces and variations in said at least one slide and actuator.

11. The apparatus of claim 10 further including means for storing said variations in said individual metrology surfaces and said at least one slide and actuator and providing error correction in the measurements of the motion and position of said first and second elements with respect to one another.

12. The apparatus of claim 11 wherein said means for storing said variations and providing error correction comprises a look up table (LUT).

13. The apparatus of claim 12 further including means for updating the values of said error correction.

14. The apparatus of claim 1 wherein said metrology frame and said second element are substantially in the shape of a triangle.

15. The apparatus of claim 1 wherein said information provided by said multiple measuring systems comprises information with respect to either at least the gap, an angle, or two angles between corresponding surfaces in said first element and said second element.

* * * * *